UNITED STATES PATENT OFFICE.

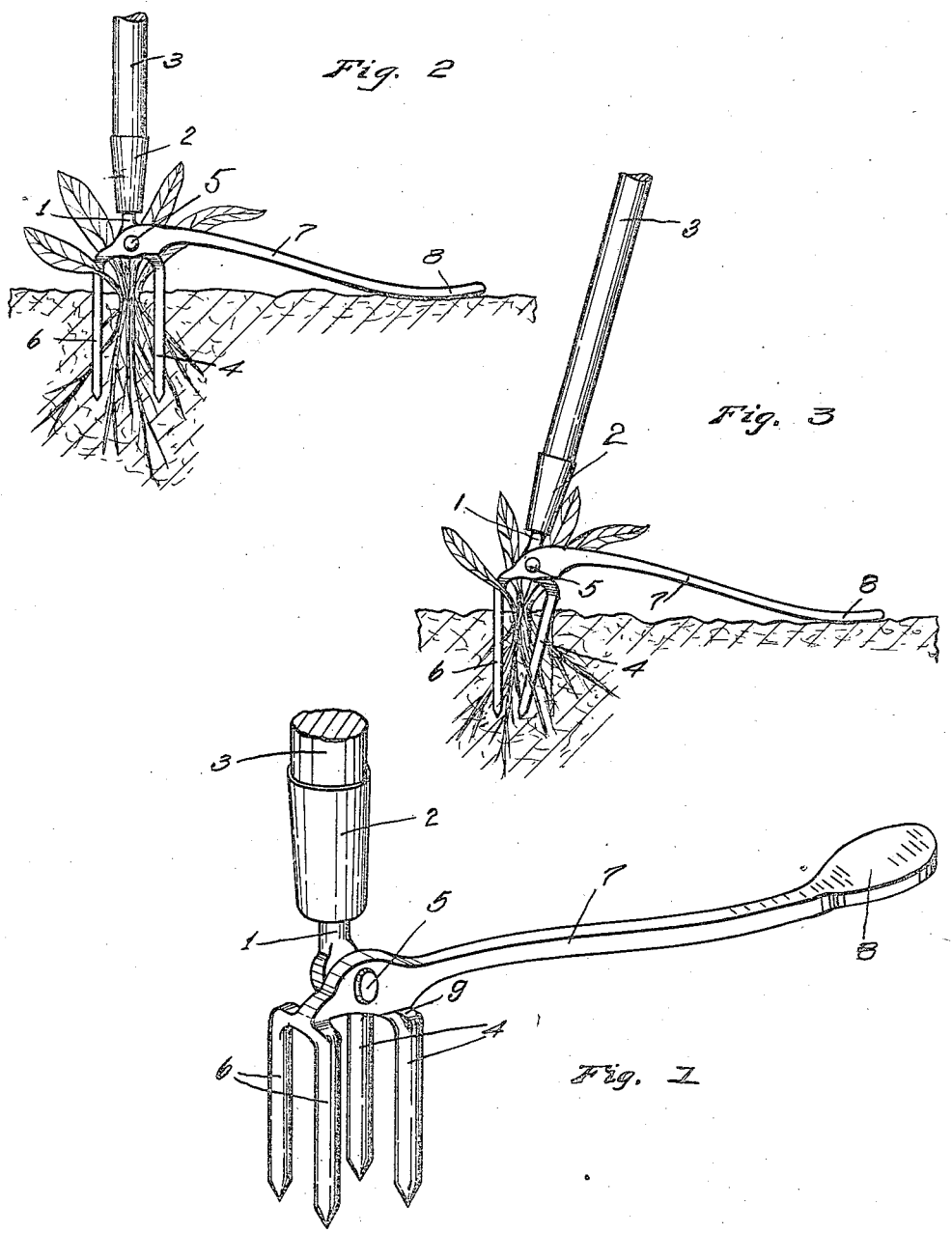

MORRIS C. HAYES, OF SEATTLE, WASHINGTON.

WEED-PULLER.

1,065,606.  Specification of Letters Patent.  Patented June 24, 1913.

Application filed November 25, 1912. Serial No. 733,294.

*To all whom it may concern:*

Be it known that I, MORRIS C. HAYES, a citizen of the United States, residing at Seattle, in the county of King and State of Washington, have invented certain new and useful Improvements in Weed-Pullers, of which the following is a specification.

This invention relates to improvements in weed-extractors, and has for its object the provision of an implement of simple construction that will pull weeds, including their entire roots, from the soil in an effective manner.

In eradicating from the soil certain species of weed such as the dandelion which particularly infest lawns, it is a matter of some difficulty to extract the entire top root and some of the main lateral roots without leaving a sufficient remnant that will produce a new plant.

The present invention has for its further object the provision of a device that will not cut the branching roots of the weed but will draw the rootlets together and compact the soil therewith and permit the entire plant to be withdrawn from the soil with complete and satisfactory results.

The invention consists in the novel construction of a weed puller including a pair of relatively movable hinged jaws, and the adaptation and combination therewith of devices for actuating and manipulating the several parts, as will be fully described in the following specification, illustrated in the accompanying drawings, and finally set forth in the appended claims.

In said drawings, Figure 1 is a perspective view of an implement embodying my invention, with a portion of the handle broken away. Figs. 2 and 3 are pictorial views in side elevation of the same, illustrating the manner of using the invention.

Referring to said drawings, the reference numeral 1 indicates the stem of a jaw-member of a weed puller of my invention, 2 a socket for the reception of a handle 3, and 4 a plurality of sharp pointed prongs or blades integral with said stem and offset from and parallel with the extended longitudinal axis of said handle. Hingedly connected to said stem, as by a pivoted pin 5, is a relatively movable jaw-member provided with prongs 6 oppositely corresponding to prongs 4 and arranged symmetrically upon the opposite side of said handle axis. Said movable jaw-member is extended laterally to afford a treadle-lever 7 controlling the movement of said prongs 6. Said treadle-lever may terminate in a horizontally flattened extremity 8 and its weight is sufficient to overbalance the opposite end bearing said prongs 6 and is adapted ordinarily to rest upon the shoulder 9 of the first mentioned jaw-member and maintain said prongs 6 normally in parallel with the corresponding prongs 4. In the illustrated embodiment said prongs are positioned at the corners of an area square in cross-section and when intruded into the earth about a weed, as shown in Fig. 2, as by pressing downwardly upon the handle assisted, if desired, by the foot of the operator pressing upon the lever 7, will inclose a straight-sided column of soil including the plant to be removed. With the foot of the operator resting upon the extremity of the treadle-lever, the handle is then inclined toward said lever, as shown in Fig. 3, causing a corresponding converging inclination of the lower extremities of the prongs 4 toward the prongs 6 and compression of the lower portion of said contained column of earth compacting the same about the rootlets of the plant. Continued inclination of the handle in the same direction results in further packing the inclosed earth until the resistance to compression becomes sufficient to prevent further relative movement of the jaw-members whereupon the entire structure is lifted with the inclosed soil and weed. With the lever extremity 8 as a fulcrum, the jaw-members are thus elevated in an arcuate path clear of the ground level with a single movement of the handle 3. The roots of the inclosed weed are drawn together into the restricted area bounded by the prongs and the downwardly converging relation of the respective groups of prongs prevents the included earth and plant from being released until withdrawn from the soil. When clear of the ground, the handle may be straightened to its normal vertical position while the weight of said treadle-lever will cause the jaw-members to separate and the column of earth with its contained weed will be deposited upon the ground and the device be in condition to repeat the operation.

The implement is light in weight and extremely simple in construction and operation. In entering the ground about a weed, it does not cut or break its branching roots but succeeds in causing all the main roots to be gathered together and removed thus preventing a further growth therefrom.

While I have described my invention with some particularity, I do not wish to be confined to the precise details of construction illustrated, as obviously various changes and modifications of parts may be made within the scope of the claims without departing from the spirit of the invention or sacrificing its advantages.

Having described my invention, what I claim as new and desire to secure by Letters-Patent of the United States, is—

1. In a weed-puller, a jaw-member provided with a handle and a plurality of prongs in parallel offset relation thereto, another jaw-member pivotally connected to said first-named jaw-member and provided with a plurality of prongs, a lever integrally connected to the second named jaw-member extending in rectangular directions relative to the prongs integral therewith and also when inoperative extending in rectangular directions relative to said handle.

2. In a weed-puller, the combination of a jaw-member including a shank, a handle connected to said shank, a pair of prongs offset and in parallel axial alinement with said handle and affording a protruding shoulder, another jaw-member pivotally connected to said shank provided with a pair of prongs oppositely disposed relative to said first named prongs, a lever integrally connected to the second named jaw extending in rectangular directions relative to the prongs integral therewith and adapted to rest upon said shoulder to limit the extent of separation of said jaws.

Signed at Seattle, Wash., this 16th day of November, 1912.

MORRIS C. HAYES.

Witnesses:
HORACE BARNES,
E. PETERSON.